US011700837B1

(12) United States Patent
Song et al.

(10) Patent No.: US 11,700,837 B1
(45) Date of Patent: Jul. 18, 2023

(54) PET SAFETY MANAGEMENT METHOD AND SYSTEM, COMPUTER EQUIPMENT AND STORAGE MEDIUM

(71) Applicant: Xingchongwangguo (Beijing) Technology Co., Ltd, Beijing (CN)

(72) Inventors: Cheng Song, Beijing (CN); Baoguo Liu, Beijing (CN); Jinyou Hu, Beijing (CN); Hao Wu, Beijing (CN); Kaiyan Liang, Beijing (CN); Weipeng Guo, Beijing (CN); Hai Li, Beijing (CN); Jingjing Gong, Beijing (CN)

(73) Assignee: Xingchongwangguo (Beijing) Technology Co., Ltd, Beijing (CN)

( * ) Notice: Subject to any disclaimer, the term of this patent is extended or adjusted under 35 U.S.C. 154(b) by 0 days.

(21) Appl. No.: 18/152,132

(22) Filed: Jan. 9, 2023

(30) Foreign Application Priority Data

Aug. 12, 2022 (CN) .......................... 202210966340.4

(51) Int. Cl.
| G06K 9/00 | (2022.01) |
| A01K 29/00 | (2006.01) |
| G06V 20/52 | (2022.01) |
| G06V 40/16 | (2022.01) |

(52) U.S. Cl.
CPC ............ *A01K 29/005* (2013.01); *G06V 20/52* (2022.01); *G06V 40/171* (2022.01); *G06V 40/172* (2022.01); *G06V 2201/07* (2022.01)

(58) Field of Classification Search
CPC .... A01K 29/005; G06V 20/52; G06V 40/171; G06V 40/172; G06V 2201/07
See application file for complete search history.

(56) References Cited

U.S. PATENT DOCUMENTS

| 2020/0184227 A1* | 6/2020 | Felhi ...................... G06V 40/50 |
| 2020/0302763 A1* | 9/2020 | Li ..................... G08B 13/19684 |
| 2020/0327315 A1* | 10/2020 | Mullins .............. G08B 13/1968 |

FOREIGN PATENT DOCUMENTS

| CN | 105632049 A | 6/2016 |
| CN | 105761422 A | 7/2016 |
| CN | 106157532 A | 11/2016 |
| CN | 109145883 A | 1/2019 |
| CN | 111507211 A | 8/2020 |
| CN | 112273269 A | 1/2021 |
| CN | 113409822 A | 9/2021 |
| CN | 113421397 A | 9/2021 |
| CN | 114494939 A | 5/2022 |

* cited by examiner

*Primary Examiner* — Dhaval V Patel (57) ABSTRACT

The present application relates to a pet safety management method and system, computer equipment and a storage medium. The method includes: acquiring a first video comprising a target pet and a target object, the target object being an active object except the target pet; analyzing the first video to determine a first state of the target pet and a second state of the target object; acquiring a surrounding environment video of the target pet if the target pet is determined to be in an initial dangerous state according to the first state and the second state; and analyzing the surrounding environment, determining that the target pet is in a dangerous state if the surrounding environment is an interference-free environment, and controlling an warning device carried by the target pet to send a warning message to timely prevent a pet from being stolen.

3 Claims, 3 Drawing Sheets

PET SAFETY MANAGEMENT METHOD AND SYSTEM, COMPUTER EQUIPMENT AND STORAGE MEDIUM

CROSS REFERENCE TO RELATED APPLICATIONS

This application claims foreign priority of Chinese Patent Application No. 202210966340.4, filed on Aug. 12, 2022 in the China National Intellectual Property Administration, the disclosures of all of which are hereby incorporated by reference.

TECHNICAL FIELD

The present application relates to the technical field of pet management, particularly to a pet safety management method and system, computer equipment and a storage medium.

BACKGROUND OF THE PRESENT INVENTION

In recent years, more and more people choose to keep pets. As a result, some pets are often stolen. At present, the phenomenon of pets being stolen has attracted more and more attention from the society. However, at present, after the pets are stolen, the owner of the pet reports the case, and relevant personnel conduct manual troubleshooting based on videos. In most cases, the troubleshooting happens after the event has occurred, which cannot timely prevent pets from being stolen.

SUMMARY OF PRESENT INVENTION

To this end, aiming at the above technical problems, it is necessary to provide a pet safety management method and system, computer equipment and a storage medium.

In a first aspect, provided is a pet safety management method, the method comprising:

acquiring a first video comprising a target pet and a target object which is an active object except the target pet;

analyzing the first video to determine a first state of the target pet and a second state of the target object;

acquiring the surrounding environment video of the target pet if the target pet is determined to be in an initial dangerous state according to the first state and the second state analyzing the surrounding environment video, determining that the target pet is in a dangerous state if the surrounding environment is an interference-free environment, and controlling the warning device carried by the target pet to send out a warning message; wherein, the interference-free environment is an environment that does not interfere with the target object to capture the target pet.

In a second aspect, provided is a pet safety management system, the system comprising:

an acquisition module for acquiring a first video comprising a target pet and a target object which is an active object except the target pet;

an analysis module for analyzing the first video to determine a first state of the target pet and a second state of the target object;

an initial state determination module for acquiring a surrounding environment video of the target pet if the target pet is determined to be in an initial dangerous state according to the first state and the second state;

a warning module for analyzing the surrounding environment video, determining that the target pet is in a dangerous state if the surrounding environment is an interference-free environment, and controlling a warning device carried by the target pet to send out a warning message; wherein, the interference-free environment is an environment that does not interfere with the target object to capture the target pet.

In a third aspect, provided is computer equipment, comprising a memorizer, a processor and a computer program stored on the memorizer and operating on the processor, wherein the following method is achieved when the processor executes the computer program:

acquiring a first video comprising a target pet and a target object which is active object except the target pet;

analyzing the first video to determine a first state of the target pet and a second state of the target object;

acquiring the surrounding environment video of the target pet if the target pet is determined to be in an initial dangerous state according to the first state and the second state;

analyzing the surrounding environment video, determining that the target pet is in a dangerous state if the surrounding environment is an interference-free environment, and controlling the warning device carried by the target pet to send out the warning message; wherein the interference-free environment is an environment that does not interfere with the target object to capture the target pet.

In a fourth aspect, provided is a computer-readable storage medium on which a computer program is stored, wherein the following method is achieved when the computer program is executed by the processor:

acquiring a first video comprising a target pet and a target object, the target objects being an active object except the target pet;

analyzing the first video to determine a first state of the target pet and a second state of the target object;

acquiring a surrounding environment video of the target pet if the target pet is determined to be in an initial dangerous state according to the first state and the second state; and analyzing the surrounding environment video, and determining that the target pet is in a dangerous state if the surrounding environment is an interference-free environment, and controlling the warning device carried by the target pet to send out the warning message; wherein, the interference-free environment is an environment that does not interfere with the target object to capture the target pet.

Provided are the above pet safety management method and system, the computer equipment and the storage medium. The method includes: acquiring a first video comprising a target pet and a target object which is an active object except the target pet; analyzing the first video to determine a first state of the target pet and a second state of the target object; acquiring the surrounding environment video of the target pet if the target pet is determined to be in an initial dangerous state according to the first state and the second state; analyzing the surrounding environment video, determining that the target pet is in a dangerous state if the surrounding environment is an interfering-free environment, and controlling the warning device carried by the target pet to send out a warning message; wherein the interference-free environment is an environment that does not interfere with the target object to capture the target pet. Where, according to the state of the target pet, the state of the active objects other than the target pet and the surrounding environment video, it is determined that whether the target pet is in a dangerous state, the warning device carried by the target pet is controlled to send out the warning message when in the dangerous state to timely prevent the pet from being stolen.

DETAILED DESCRIPTION OF PREFERRED EMBODIMENTS

To make the purpose, technical solution and advantages of the present application more clear, the present application will be further described in detail in combination with drawings and embodiments. It should be understood that, specific embodiments described here are only for explaining the present application but not limiting the present application.

Figure 1:
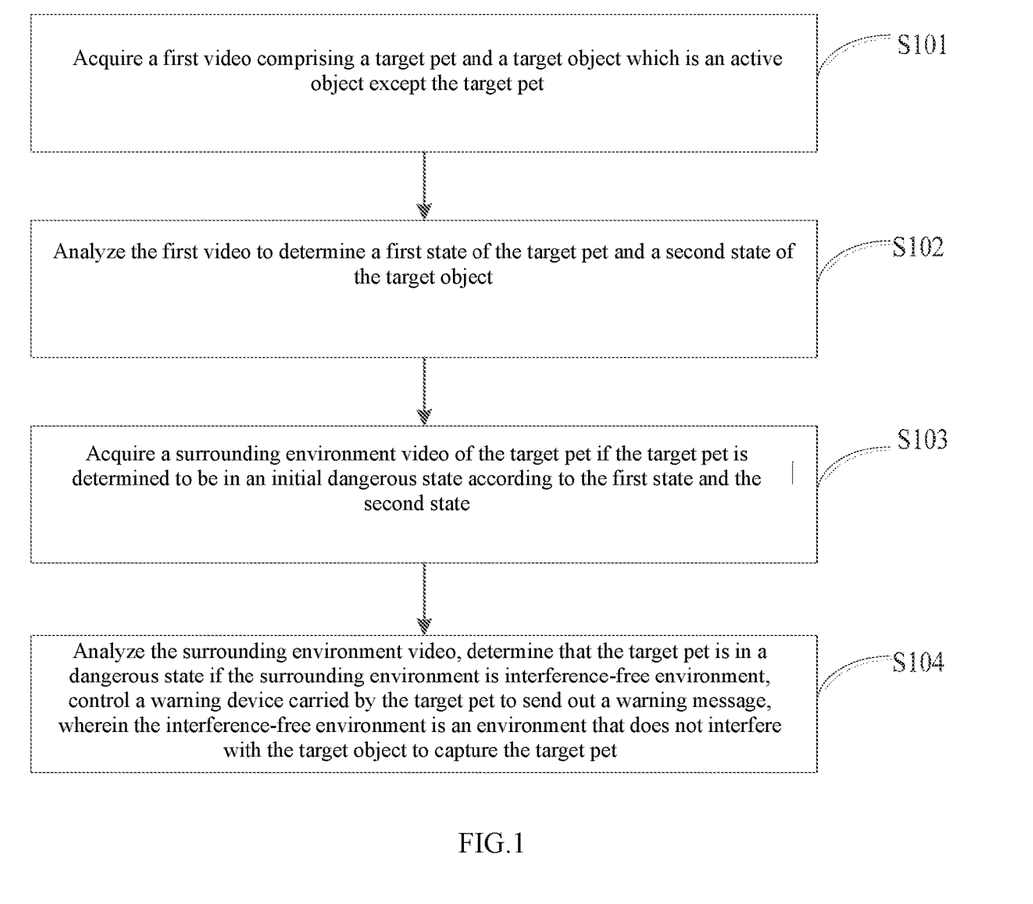
FIG. 1 is a flowchart of a pet safety management method in an embodiment.

In an embodiment, as shown in FIG. 1, provided is a pet safety management method, comprising the following steps:

S101, acquiring a first video comprising a target pet and a target object which is an active object except the target pets;

wherein, a second video comprising a pet and an initial object is acquired; the initial object is an active object comprising the pet; the initial object includes people and/or vehicles; the pet and the initial object in the second video are tracked, identified and analyzed to determine the distance and the capture relationship between the pet and the initial object; if the distance is less than the preset distance and the capture relationship is that the initial object captures the pet, the pet is determined as the target pet and the initial object is determined as the target object.

Wherein, tracking and recognition is the existing tracking and analysis technology, the video is identified using the existing recognition technology to obtain a tag box which shows the pet and the object, the tag box is tracked and analyzed to determine the distance between the tag box comprising the pet and the tag block comprising the initial object and determine the capture relationship between the tag box comprising the pet and the tag block comprising the initial object, wherein the capture relationship can be determined according to the movement between the tag box comprising the pet and the tag block comprising the initial object, for example, the tag block comprising the initial object moves along the movement of the tag block comprising the initial object so that it is determined that the capture relationship is that the initial object captures the pet. Wherein, the tracking, identifying and analysis belong to the existing technology, and is not described here.

S102, analyzing the first video to determine the first state of the target pet and the second state of the target object;

wherein, if the initial object includes people, the analyzing the first video to determine the first state of the target pet and the second state of the target object includes: the first video is analyzed to determine the first state of the target pet and the second state of the target object; the first state includes a first sound state and a first expression state; the second state includes a second expression state;

if the initial object includes the vehicle, the analyzing the first video to determine the first state of the target pet and the second state of the target object includes: the first video is analyzed to determine the first state of the target pet and the second state of the target object; the first state includes a first sound state and a first expression state; the second state includes vehicles door state;

if the initial object includes people and vehicles, the analyzing the first video to determine the first state of the target pet and the second state of the target object includes: the first video is analyzed to determine the first state of the target pet and the second state of the target object; the first state includes a first sound state and a first expression state; the second state includes a second expression state and vehicles door state.

S103, acquiring the surrounding environment video of the target pet if the target pet is determined to be in an initial dangerous state according to the first state and the second state;

wherein, the initial dangerous state indicates that the target pet is likely to be in a dangerous state, but may not be in a dangerous state, but the probability of being in a dangerous state is relatively high, for example, the target pet may be in a dangerous state in a probability of 80%.

Wherein, if the initial object includes people, the determining that the target pet is in an initial dangerous state according to the first state and the second state includes: if the first sound state meets the preset treble state, the first expression state meets the first preset expression state and the second expression state meets the second preset expression state, the target pet is determined to be in an initial dangerous state;

if the initial object includes vehicles, the determining that the target pet is in an initial dangerous state according to the first state and the second state includes: if the first sound state meets the preset treble state, the first expression state meets the first preset expression state and the vehicle door state is an opening state, the target pet is determined to be in an initial dangerous state;

if the initial object includes people and vehicle, the determining that the target pet is in an initial dangerous state according to the first state and the second state includes: if the first sound state meets the preset treble state, the first expression state meets the first preset expression state, the second expression state meets the second preset expression state and the vehicle door state is an opening state, the target pet is determined to be in an initial dangerous state.

In the embodiments of the disclosure, if the initial object includes people, the first sound state meets the preset treble state, the first expression state meets the first preset expression state and the second expression state meets the second preset expression state, the target pet is determined to be in an initial dangerous state.

Wherein, the first sound is compared with the preset volume of the pet, if the first sound is greater than the preset volume of the pet, it means that the first sound state meets the preset treble state. Wherein, the first preset expression state is a panic or fear expression state, if the first expression state is the panic or fear expression state, the first expression state of the initial object meets the first preset expression state. Wherein, the second preset expression state is a tense expression state, if the second expression state is the tense expression state, the second expression state meets the second preset expression state.

Wherein, determining the expression state of pets or people belongs to the existing feature recognition and analysis technology and is not repeated here.

In the embodiments of the disclosure, if the initial object includes the vehicle, the first sound state meets the preset treble state, the first expression state meets the first preset expression state and the vehicle door state is an opening state, the target pet is determined to be in an initial dangerous state.

Wherein, the first sound is compared with the preset volume of the pet, if the first sound is greater than the preset volume of the pet, it means that the first sound state meets the preset treble state. Wherein, the first preset expression state is the panic or fear expression state, if the first expression state is the panic or fear expression state, the first expression state of the initial object meets the first preset expression state. Wherein, the vehicle door state includes a door opening state and a door closing state. If the first sound state meets the preset treble state, the first expression state is panic or fear expression state and the vehicle door state is the door opening state, the target pet is determined to be in an initial dangerous state.

In the embodiments of the disclosure, if the initial object includes people and vehicles, if the first sound state meets the preset treble state, the first expression state meets the first preset expression state, the second expression state meets the second preset expression state and the vehicle door state is the door opening state, the target pet is determined to be in an initial dangerous state.

Wherein, the first sound is compared with the preset volume of the pet, if the first sound is greater than the preset volume of the pet, it means that the first sound state meets the preset treble state. Wherein, the first preset expression state is the panic or fear expression state, if the first expression state is the panic or fear expression state, the first expression state of the initial object meets the first preset expression state. Wherein, the second preset expression state is a tense expression state, if the second expression state is the tense expression state, the second expression state meets the second preset expression state. Wherein, the vehicle door state includes the door opening state and the door closing state. Wherein, if the first sound state meets the preset treble state, the first expression state is the panic or fear expression state, the second expression state is the tense expression state, and the vehicle door state is the door opening state, the target pet is determined to be in the initial dangerous state.

S104, analyzing the surrounding environment video, determining that the target pet is in a dangerous state if the surrounding environment is an interfering-free environment, and controlling the warning device carried by the target pet to send out a warning message; wherein, the interference-free environment is an environment that does not interfere with the target object to capture the target pet.

Wherein, the interference-free environment is an environment that does not interfere with the target object to capture the target pet, and can also be interpreted as an environment that does not comprise other objects or other active organisms such as pets except the target object and the target pet.

Wherein, the surrounding environment video is analyzed, if the surrounding environment is an environment that does not comprise other objects or other active organisms such as pets except the target object and the target pet, the target pet is determined to be in a dangerous state, and the warning device carried by the target pets is controlled to send out the warning message. Wherein, the warning device sending out the warning message is to transmit the warning message to a host, or send out a warning sound in the current environment.

In an optional embodiment, if the surrounding environment is an interference environment, the interference environment is analyzed; if there are other pets other than the target pet in the interference environment, the states of the other pets are acquired; whether the target pet is in a dangerous state is determined according to the states of the other pets; wherein, the states of the other pets include a third sound state and a third expression state; if the target pet is determined to be in a dangerous state according to the third sound state and the third expression state, the warning device carried by the target pet is controlled to send out the warning message.

In the embodiments of the disclosure, if the surrounding environment is an interference environment, it means that the surrounding environment includes other objects or active organisms such as pets except the target object and the target pet. If there are other pets other than the target pet in the interference environment, the states of other pets are acquired; whether the target pet is in a dangerous state is determined according to the states of other pets; wherein, the states of other pet include a third sound state and a third expression state; if the target pet is determined to be in a dangerous state according to the third sound state and the third expression state, and the warning device carried by the target pet is controlled to send out the warning message.

Wherein, if the third sound state meets the preset treble state and the third expression state meets the first preset expression state, the target pet is determined to be in a dangerous state. Wherein, the third sound is compared with the preset volume of the pet, if the third sound is greater than the preset volume of the pet, it means that the third sound state meets the preset treble state. Wherein, the first preset expression state is a panic or fear expression state, if the third expression state is the panic or fear expression state, the third expression state meets the first preset expression state. Wherein, if the third sound is greater than the preset volume of the pet and the third expression state is the panic or fear expression state, the target pet is determined to be in a dangerous state, and the warning device carried by the target pet is controlled to send out the warning message.

In an optional embodiment, if there are other objects other than the target object in the interference environment, the states of the other objects are acquired; wherein the other objects include people and/or vehicles; whether the target pet is in a dangerous state is determined according to the states of the other objects; if the target pet is determined to be in a dangerous state, the warning device carried by the target pet is controlled to send out the warning message.

In the embodiments of the disclosure, if the other objects include people, whether the target pet is determined in a dangerous state according to the states of the other objects; if the target pet is determined to be in a dangerous state, the warning device carried by the target pet is controlled to send out the warning message, which includes: whether the target pet is determined in a dangerous state according to the sight states of the other objects; if the duration for the other objects to stay in the sight of the target pet is less than preset time, the target pet is determined to be in a dangerous state, and the warning device carried by the target pet is controlled to send out the warning message.

Wherein, acquiring the sight of one object staying in another object (for example, a pet) and the duration for staying on the sight belongs to the existing technology in the art, and is not repeated here.

In the embodiments of the disclosure, if the other objects include vehicles, whether the target pet is in a dangerous state is determined according to the states of the other objects; if the target pet is in a dangerous state is determined, the warning device carried by the target pet is controlled to send out the warning message, which includes: whether the target pet is in a dangerous state is determined according to the driving states of the other objects; if the driving states of the other objects is non-opposite driving states, the target pet is determined to be in a dangerous state, and the warning device carried by the target pet is controlled to send out the warning message.

Wherein, all other driving states that the vehicle does not drive toward the target pet are determined as non-opposite driving states.

In the embodiments of the disclosure, if the other objects include people and vehicles, whether the target pet is in a dangerous state determined according to the states of the other objects; if the target pet is in a dangerous state is determined, the warning device carried by the target pet is controlled to send out the warning message, which includes: whether the target pet is in a dangerous state is determined according to the sight states of the other objects and the driving states of the other objects; if the slight duration for other objects to stay on the target pet is less than the preset time, and the driving states of the other objects are non-opposite driving states, the target pet is determined to be in a dangerous state, and the warning device carried by the target pet is controlled to send out the warning message.

Wherein, after the warning device carried by the target pet is controlled to send out the warning message, included is:

the warning devices carried by other pets within the preset range of the target pet are acquired, and determine the location of the warning device carried by each other pet is determined;

the surrounding environment video at the location of the warning device is acquired to determine whether there are pedestrians in the surrounding environment video at the location of the warning device;

if there are pedestrians and the pedestrians are not sheltered, the pedestrian's features are extracted, the extracted features are compared with the preset identity database to determine the pedestrian's identity ID;

the device ID information of the warning device carried by other pets within the preset range of the target pet is acquired;

the preset relational database is queried to determine the user ID information corresponding to the device ID information;

the ID of the pedestrian is matched with the user ID information, if match, it is determined that the pedestrian is the owner of the pet carrying the warning device and the pedestrian is beside the pedestrian's pet, and the pedestrian's body state is acquired;

if the pedestrian's body is in good condition, the warning device carried by the target pet is controlled to send out the warning message to the warning devices carried by other pets.

In the embodiments of the disclosure, the warning devices carried by other pets within the preset range of the target pet (within 10 meters around the target pet as the center) are acquired, and the location of the warning device carried by each other pet is determined using the existing positioning technology; the surrounding environment video at the location of the warning device is acquired, and whether there are pedestrians in the surrounding environment video at the location of the warning device is determined; if there is a pedestrian and the pedestrian is not sheltered (for example, a hat or mask is not wore), it means that the pedestrian's features can be extracted, and the extracted features are compared with the preset identity database to determine the pedestrian's ID; in addition, the device ID information of the warning devices carried by other pets within the preset range of the target pet (within 10 meters around the target pet) is acquired; the preset relational database (the preset relational database stores the device ID information and user ID information which are in one-to-one correspondence) is queried to determine the user ID information corresponding to the device ID information; the pedestrian's identity ID is matched with the user ID information, if match, it is determined that the pedestrian is the owner of the pet with the warning device and the pedestrian is beside the pet, and the pedestrian's body state is further acquired; if the pedestrian's body is in good condition, the warning device carried by other pet is controlled to send out the warning to the warning devices of the other pets.

Wherein, the body state of the pedestrian is acquired, if the body state of the pedestrian is an old person or people who is unwell (for example, it is determined through a server that the pedestrian has recently undergone surgery, etc.), the warning device carried by the target pet is controlled not to send out a warning message to the warning device corresponding to the pedestrian being in bad condition so as to prevent the pedestrian being in bad condition from bringing danger to the pedestrian being in bad condition when stopping stealing pets.

It should be understood that although the steps in the flowchart of FIG. 1 are displayed in order as indicated by the arrows, these steps are not necessarily executed in order as indicated by the arrows. Unless explicitly stated herein, these steps are not strictly executed in order and can also be executed in other orders. Moreover, at least some of the steps in FIG. 1 may include multiple steps or phases which are not necessarily completed at the same time, but may be executed at different times. The execution order of these steps or phases is not necessarily sequential, but can be executed in turn or alternately with other steps or at least some of the steps or phases in other steps.

Figure 2:
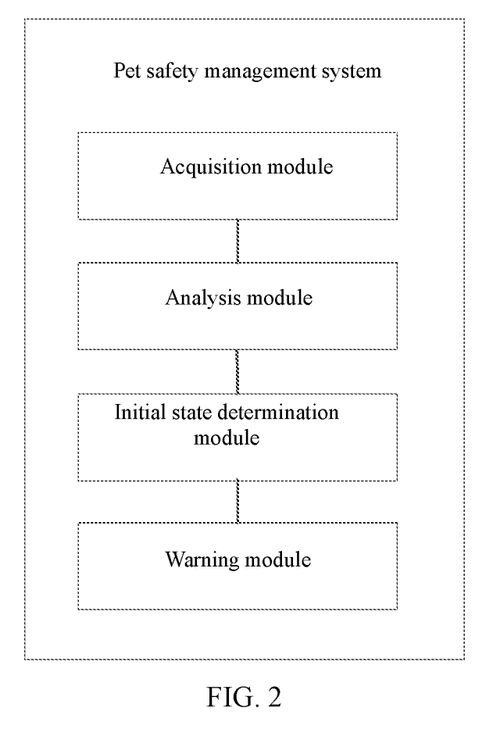
FIG. 2 is a structure block diagram of a pet safety management system in an embodiment.

In one embodiment, as shown in FIG. 2, provided is a pet safety management system, including:

an acquisition module for acquiring a first video comprising a target pet and a target object which is an active object except the target pet;

an analysis module for analyzing the first video to determine the first state of the target pet and the second state of the target object;

an initial state determination module for acquiring a surrounding environment video of the target pet if the target pet is determined to be in an initial dangerous state according to the first state and the second state;

a warning module for analyzing the surrounding environment video. If the surrounding environment is an interference-free environment, the target pet is in a dangerous state and the warning device carried by the target pet is controlled to send out the warning message; wherein, the interference-free environment is an environment that does not interfere with the target object to capture the target pet.

In one optional embodiment, the acquisition module is configured to:

acquire a second video comprising the pet and the initial object which includes people and/or vehicles;

track, identify and analyze the pet and the initial object in the second video to determine the distance and the capture relationship between the pet and the initial object;

if the distance is less than the preset distance and the capture relationship is that the initial object captures the pet, the pet is determined as the target pet and the initial object is determined as the target object.

In one of optional embodiments, if the initial object includes people, the analysis module is configured to analyze the first video to determine the first state of the target pet and the second state of the target object; the first state includes a first sound state and a first expression state; the second state includes a second expression state;

if the initial object includes vehicles, the analysis module is configured to analyze the first video to determine the first state of the target pet and the second state of the target object; the first state includes a first sound state and a first expression state; the second state includes the vehicle door state;

if the initial object includes people and vehicles, the analysis module is configured to: analyze the first video to determine the first state of the target pet and the second state of the target object; the first state includes a first sound state and a first expression state; the second state includes a second expression state and a door state.

In one of the optional embodiments, if the initial object includes people, the initial state determination module is configured to determine that the target pet is in an initial dangerous state if the first sound state meets the preset treble state, the first expression state meets the first preset expression state and the second expression state meets the second preset expression state;

if the initial object includes vehicles, the initial state determination module is configured to: determine that the target pet is in an initial dangerous state if the first sound state meets the preset treble state, the first expression state meets the first preset expression state, and the vehicle door state is the opening state;

if the initial object includes people and vehicles, the initial state determination module is configured to: determine that the target pet is determined to be in an initial dangerous state if the first sound state meets the preset treble state, the first expression state meets the first preset expression state, the second expression state meets the second preset expression state, and the vehicle door state is the opening state.

In one of the optional embodiments, the alarm module is configured to:

analyze the interference environment if the surrounding environment is interference environment;

acquire the states of the other pets if there are other pets other than the target pet in the interference environment;

determine whether the target pet is in a dangerous state according to the state of the other pets; the states of the other pets include a third sound state and a third expression state;

control the warning device carried by the target pet to send out the warning message if the target pet is determined to be in a dangerous state according to the third sound state and the third expression state;

acquire the states of the other objects if there are other objects other than the target object in the interference environment; wherein the other objects include people and/or vehicles;

determine whether the target pet is in a dangerous state according to the state of the other objects; and control the warning device carried by the target pet to send out the warning message if the target pet is determined to be in a dangerous state.

In one of the optional embodiments, if the other objects include people, the alarm module is configured to determine whether the target pet is in a dangerous state according to the sight states of the other objects; if the duration for the other objects to stay in the sight of the target pet is less than the preset time, the target pet is determined to be in a dangerous state, and the warning device carried by the target pet is controlled to send out the warning message;

if the other objects include vehicles, the alarm module is configured to determine whether the target pet is in a dangerous state according to the driving states of the other objects; if the driving states of the other objects are non-opposite driving states, the target pet is determined to be in a dangerous state, and the warning device carried by the target pet is controlled to send out the warning message;

if the other objects include people and vehicles, the alarm module is configured to determine whether the target pet is in a dangerous state according to the sight states of the other objects and the driving states of the other objects; if the slight duration for the other objects to stay on the target pet is the preset time and the driving states of the other objects are non-opposite driving states, the target pet is determined to be in a dangerous state, and the warning device carried by the target pet is controlled to send out the warning message.

In one of the optional embodiments, the alarm module is configured to:

acquire the warning device carried by other pets within the preset range of the target pet, and determine the location of the warning device carried by each other pet;

acquire the surrounding environment video at the location of the warning device, and determine whether there are pedestrians in the surrounding environment video at the location of the warning device;

if there is a pedestrian and the pedestrian is not sheltered, the pedestrian's features are extracted, the extracted features are compared with the preset identity database to determine the pedestrian's identity ID;

acquire the device ID information of the warning devices carried by other pets within the preset range of the target pet;

query the preset relational database to determine the user ID information corresponding to the device ID information;

match the ID of the pedestrian with the user ID information. If match, it is determined that the pedestrian is the owner of the pet carried by the warning device, and the pedestrian is beside the pedestrian's pet, and the pedestrian's body state is acquired;

if the pedestrian's body is in good condition, the warning device carried by the target pet is controlled to send out the warning message to the warning devices carried by other pets.

In one embodiment, provided is computer equipment. The computer equipment can be a server, and its internal structure can be shown in FIG. 3. The computer equipment includes a processor, a memory and a network interface which are connected through a system bus. Wherein, the processor of the computer equipment is configured to provide computing and control capabilities. The memory of the computer equipment includes a nonvolatile storage medium and an internal memory. The nonvolatile storage medium stores an operating system, computer programs and a database. The internal storage device provides an environment for the operation of the operating system and computer programs in the nonvolatile storage medium. The database of the computer equipment is configured to store data. The network interface of the computer equipment is used for communicating with external terminals through network connection. When the computer program is executed by the processor, a pet safety management method is realized.

Figure 3:
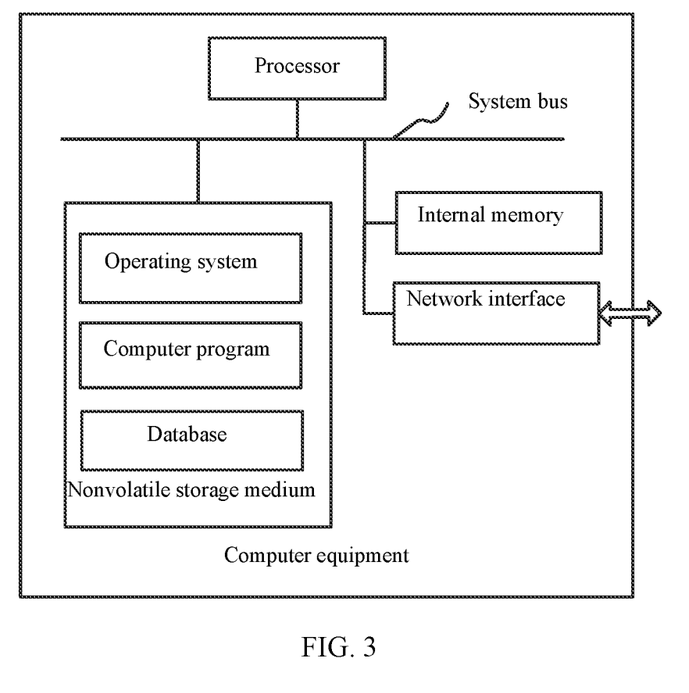
FIG. 3 is an internal structure diagram of computer equipment in an embodiment.

It can be understood by those skilled in the art that the structure shown in FIG. 3 is only a block diagram of partial structures associated with the solution of the present application, and does not constitute a limitation of the computer equipment applied to the solution of the present application. Specific computer equipment may include more or fewer components than shown those in the figure, or integrate some components, or have different component arrangements.

In one embodiment, provided is computer equipment, including a memory, a processor and a computer program stored on the memory and operating on the processor. Each step in the above embodiments is implemented when processor executes the computer program.

In one embodiment, provided is a computer-readable storage medium on which a computer program is stored. When the computer program is executed by a processor, each step in the above embodiments is implemented.

Those skilled in the art can understand that all or part of the processes in the methods of the above embodiments can be accomplished by instructing relevant hardware through the computer program. The computer program can be stored in a nonvolatile computer readable storage medium. When the computer program is executed, it can include the processes of the embodiments of the above methods. Any reference to memory, storage, database or other media used in the embodiments provided in the present application can include at least one of nonvolatile and volatile memories. The nonvolatile memory can include a read only memory (ROM), a tape, a floppy disk, a flash memory or an optical memory. The volatile memory can include a random access memory (RAM) or an external cache memory. As an illustration rather than limitation, RAM can be in many forms, such as a static random access memory (SRAM) or a dynamic random access memory (DRAM).

The technical features of the above embodiments can be combined arbitrarily. To make the description concise, all possible combinations of the technical features of the above embodiments are not described. However, as long as there is no contradiction in the combination of these technical features, it should be considered as the scope of the description.

The above embodiments only express several embodiments of the present application, and the description is relatively specific and detailed, but it cannot be understood as a limitation on the scope of the invention patent. It should be noted that for ordinary technicians in the art, certain changes and improvements can be made without departing from the concept of the application, which are all within the scope of protection of the present application. Therefore, the scope of protection of the present patent application shall be subject to the appended claims.

We claim:

1. A pet safety management method, the method comprising:

acquiring a second video comprising a pet and an initial object which comprises people and/or vehicles, tracking, identifying and analyzing the pet and the initial object in the second video to determine a distance and a capture relationship between the pet and the initial object, and determining that the pet is a target pet and the initial object is a target object if the distance is less than a preset distance and the capture relationship is that the initial object captures the pet;

acquiring a first video comprising the target pet and the target object which is an active object except the target pet;

analyzing the first video to determine a first state of the target pet and a second state of the target object if the initial object comprises people, the first state comprising a first sound state and a first expression state, and the second state comprising a second expression state; determining that the target pet is in an initial dangerous state if the first sound state meets a preset treble state, the first expression state meets a first preset expression state and the second expression state meets a second preset expression state; and acquiring a surrounding environment video of the target pet;

analyzing the first video to determine the first state of the target pet and the second state of the target object if the initial object comprises the vehicle, the first state comprising a first sound state and a first expression state, and the second state comprising a door state; determining that the target pet is in the initial dangerous state if the first sound state meets the preset treble state, the first expression state meets the first preset expression state and the door state is in an opening state; and acquiring the surrounding environment video of the target pet;

analyzing the first video to determine the first state of the target pet and the second state of the target object if the initial object comprises people and vehicles, the first state comprising a first sound state and a first expression state, and the second state comprising a second expression state and a door state; determining that the target pet is in the initial dangerous state if the first sound state meets the preset treble state, the first expression state meets the first preset expression state, the second expression state meets the second preset expression state and the door state is in an opening state; and acquiring the surrounding environment video of the target pet;

analyzing the surrounding environment video, determining that the target pet is in a dangerous state if the surrounding environment is an interference-free environment, and controlling a warning device carried by the target pet to send out a warning message; wherein, the interference-free environment is an environment that does not interfere with the target object to capture the target pet;

analyzing an interference environment if the surrounding environment is the interference environment; acquiring the states of other pets if there are other pets other than the target pet in the interference environment; determining whether the target pet is in a dangerous state according to the states of the other pets; wherein, the states of the other pets comprise a third sound state and a third expression state; controlling the warning device carried by the target pet to send out the warning message if the target pet is determined to be in a dangerous state according to the third sound state and the third expression state; acquiring the states of the other objects if there are other objects other than the target object in the interference environment;

wherein the other objects comprise people and/or vehicles; determining whether the target pet is in a dangerous state according to the states of the other objects; and controlling the warning device carried by the target pet to send out the warning message if the target pet is determined to be in a dangerous state;

wherein, determining whether the target pet is in a dangerous state according to the states of the other objects if the other objects comprise people; controlling the warning device carried by the target pet to send out the warning message if the target pet is determined to be in a dangerous state, which comprises: determining whether the target pet is in a dangerous state according to the sight states of the other objects if the target pet is determined to be in a dangerous state; determining the target pet is in a dangerous state if a duration for the objects to stay in the sight of the target pet is less than preset time, and controlling the warning device carried by the target pet to send out the warning message;

determining whether the target pet is in a dangerous state according to the states of the other objects if the other objects comprise vehicles; controlling the warning device carried by the target pet to send out the warning message if the target pet is determined to be in a dangerous state, which comprises: determining whether the target pet is in a dangerous state according to the driving states of the other objects, if the target pet is determined to be in a dangerous state; determining that the target pet is in a dangerous state if the driving states of the other objects are non-opposite driving states, and controlling the warning device carried by the target pet to send out the warning message;

determining whether the target pet is in a dangerous state according to the states of the other objects if the other objects comprise people and vehicles; controlling the warning device carried by the target pet to send out the warning message if the target pet is determined to be in a dangerous state, which includes: determining whether the target pet is in a dangerous state according to the sight states and the driving states of the other objects, if the target pet is determined to be in a dangerous state; determining that the target pet is in a dangerous state if the duration for the other objects to stay in the sight of the target pet is less than the preset time and the driving states of the other objects are non-opposite driving states, and controlling the warning device carried by the target pet to send out the warning message; and controlling the warning device carried by the target pet to send out the warning message, followed by also comprising:

acquiring the warning devices carried by other pets within the preset range of the target pet, and determining the location of the warning device carried by each other pet; acquiring the surrounding environment video at the location of the warning device to determine whether there are pedestrians in the surrounding environment video at the location of the warning device; extracting the pedestrian's features if there are pedestrians and the pedestrians are not sheltered, comparing the extracted features with a preset identity database to determine the pedestrian's identity ID; acquiring the device ID information of the warning device carried by other pets within the preset range of the target pet; querying a preset relational database to determine user ID information corresponding to the device ID information; matching the ID of the pedestrian with the user ID information, determining that the pedestrian is an owner of a pet carried by the warning device and the pedestrian is beside the pedestrian's pet if match, and acquiring the pedestrian's body state; and controlling the warning device carried by the target pet to send out the warning message to the warning device carried by other pets if the pedestrian's body is in good condition.

2. Computer equipment, comprising a memorizer, a processor and a computer program stored on the memorizer and operating on the processor, wherein the steps of the method according to claim 1 are achieved when the processor executes the computer program.

3. A non-transitory computer-readable storage medium on which the computer program is stored, wherein the steps of the method according to claim 1 are achieved when the computer program is executed by the processor.

* * * * *